United States Patent
Fairbanks et al.

(10) Patent No.: US 7,467,500 B2
(45) Date of Patent: *Dec. 23, 2008

(54) STRAIGHT FACE SIDING

(75) Inventors: Larry R. Fairbanks, Columbus, OH (US); Samuel W. DeWorth, Pickerington, OH (US); David C. Barber, Brookfield, WI (US)

(73) Assignee: Crane Building Products LLC, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/690,689

(22) Filed: Mar. 23, 2007

(65) Prior Publication Data

US 2007/0245665 A1 Oct. 25, 2007

Related U.S. Application Data (63) Continuation of application No. 09/751,185, filed on Dec. 29, 2000, now Pat. No. 7,204,062, which is a continuation of application No. 29/133,077, filed on Nov. 20, 2000, now Pat. No. Des. 450,138.

(51) Int. Cl.
*E04D 1/28* (2006.01)
(52) U.S. Cl. .............. 52/522; 52/529; 52/539; 52/543; 52/555; 52/748.1
(58) Field of Classification Search ........... 52/309.8, 52/518–520, 522, 535–536, 539, 543, 545, 52/549, 555, 748.1, 794.1, 798.1
See application file for complete search history.

(56) References Cited

U.S. PATENT DOCUMENTS

| | | | |
|---|---|---|---|
| 1,589,675 A | 6/1926 | Belding |
| 1,728,934 A | 9/1929 | Hogenson |
| 2,830,546 A | 4/1958 | Rippe |
| D196,230 S | 9/1963 | Raftery et al. |
| 3,159,943 A | 12/1964 | Sugar et al. |
| 3,233,382 A | 2/1966 | Graveley, Jr. |
| 3,246,436 A | 4/1966 | Roush |

(Continued)

FOREIGN PATENT DOCUMENTS

CA 96829 8/2002

(Continued)

OTHER PUBLICATIONS

Sweet's General Building & Renovation, 1995 Catalog File; section 07460 on Siding, pp. 4-20.

(Continued)

*Primary Examiner*—Winnie Yip
(74) *Attorney, Agent, or Firm*—Standley Law Group LLP (57) ABSTRACT

The present invention is a siding panel and a method of making the siding panel. The siding panel comprises a planar portion extending the longitudinal length of the siding panel. The planar portion comprises a first edge and a second edge. The width from the first edge to the second edge is at least about 4.0 inches. The planar portion has a surface variance of less than about 0.05 inches relative to an imaginary straight line connecting the first edge and the second edge, and the radius curvature between the first edge and the second edge is at least about 85 inches.

32 Claims, 4 Drawing Sheets

U.S. PATENT DOCUMENTS

| | | | |
|---|---|---|---|
| 3,289,365 A | 12/1966 | McLaughlin et al. |
| 3,289,380 A | 12/1966 | Charniga, Jr. |
| 3,325,952 A | 6/1967 | Trachtenberg |
| D208,251 S | 8/1967 | Facer |
| 3,387,418 A | 6/1968 | Tyrer |
| 3,399,916 A | 9/1968 | Ensor |
| 3,473,274 A | 10/1969 | Godes |
| 3,520,099 A | 7/1970 | Mattes |
| 3,552,078 A | 1/1971 | Mattes |
| 3,555,762 A | 1/1971 | Costanzo, Jr. |
| 3,637,459 A | 1/1972 | Parish et al. |
| 3,703,795 A | 11/1972 | Mattes |
| 3,815,310 A | 6/1974 | Kessler |
| 3,826,054 A | 7/1974 | Culpepper, Jr. |
| 3,969,866 A | 7/1976 | Kyne |
| 3,970,502 A | 7/1976 | Turner |
| 4,001,997 A | 1/1977 | Saltzman |
| 4,033,802 A | 7/1977 | Culpepper, Jr. et al. |
| 4,034,528 A | 7/1977 | Sanders et al. |
| 4,048,101 A | 9/1977 | Nakamachi et al. |
| 4,081,939 A | 4/1978 | Culpepper, Jr. et al. |
| 4,096,011 A | 6/1978 | Sanders et al. |
| 4,102,106 A | 7/1978 | Golder et al. |
| 4,104,841 A | 8/1978 | Naz |
| 4,118,166 A | 10/1978 | Bartrum |
| 4,188,762 A | 2/1980 | Tellman |
| 4,189,885 A | 2/1980 | Fritz |
| 4,272,576 A | 6/1981 | Britson |
| 4,279,106 A | 7/1981 | Gleason et al. |
| 4,319,439 A | 3/1982 | Gussow |
| 4,320,613 A | 3/1982 | Kaufman |
| 4,327,528 A | 5/1982 | Fritz |
| 4,352,771 A | 10/1982 | Szabo |
| 4,389,824 A | 6/1983 | Anderson |
| 4,424,655 A | 1/1984 | Trostle |
| 4,429,503 A | 2/1984 | Holliday |
| 4,450,665 A | 5/1984 | Katz |
| D274,947 S | 7/1984 | Culpepper, Jr. et al. |
| 4,492,064 A | 1/1985 | Bynoe |
| 4,506,486 A | 3/1985 | Culpepper, Jr. et al. |
| 4,593,512 A | 6/1986 | Funaki |
| 4,608,800 A | 9/1986 | Fredette |
| 4,649,008 A | 3/1987 | Johnstone et al. |
| 4,680,911 A | 7/1987 | Davis et al. |
| D291,249 S | 8/1987 | Manning |
| 4,694,628 A | 9/1987 | Vondergoltz et al. |
| 4,709,519 A | 12/1987 | Liefer et al. |
| 4,716,645 A | 1/1988 | Pittman et al. |
| 4,782,638 A | 11/1988 | Hovind |
| 4,814,413 A | 3/1989 | Thibaut et al. |
| 4,843,790 A | 7/1989 | Taravella |
| 4,856,975 A | 8/1989 | Gearhart |
| 4,864,788 A | 9/1989 | Tippmann |
| 4,911,628 A | 3/1990 | Heilmayr et al. |
| 4,920,709 A | 5/1990 | Garries et al. |
| 4,930,287 A | 6/1990 | Volk et al. |
| 4,962,622 A | 10/1990 | Albrecht et al. |
| 4,969,302 A | 11/1990 | Coggan et al. |
| D316,299 S | 4/1991 | Hurlburt |
| 5,016,415 A | 5/1991 | Kellis |
| 5,022,204 A | 6/1991 | Anderson |
| 5,022,207 A | 6/1991 | Hartnett |
| 5,024,045 A | 6/1991 | Fluent et al. |
| 5,050,357 A | 9/1991 | Lawson |
| 5,080,950 A | 1/1992 | Burke |
| 5,090,174 A | 2/1992 | Fragale |
| 5,103,612 A | 4/1992 | Wright |
| 5,224,315 A | 7/1993 | Winter, IV |
| 5,230,377 A | 7/1993 | Berman |
| D342,579 S | 12/1993 | Mason |
| 5,282,344 A | 2/1994 | Moore |
| 5,303,525 A | 4/1994 | Magee |
| 5,306,548 A | 4/1994 | Zabrocki et al. |
| 5,318,737 A | 6/1994 | Trabert et al. |
| 5,347,784 A | 9/1994 | Crick et al. |
| 5,363,623 A | 11/1994 | King |
| 5,387,381 A | 2/1995 | Saloom |
| 5,415,921 A | 5/1995 | Grohman |
| D361,138 S | 8/1995 | Moore et al. |
| 5,443,878 A | 8/1995 | Treloar et al. |
| 5,461,839 A | 10/1995 | Beck |
| 5,465,486 A | 11/1995 | King |
| 5,465,543 A | 11/1995 | Seifert |
| 5,475,963 A | 12/1995 | Chelednik |
| 5,482,667 A | 1/1996 | Dunton et al. |
| 5,502,940 A | 4/1996 | Fifield |
| 5,537,791 A | 7/1996 | Champagne |
| 5,542,222 A | 8/1996 | Wilson et al. |
| 5,548,940 A | 8/1996 | Baldock |
| 5,551,204 A | 9/1996 | Mayrand |
| 5,560,170 A | 10/1996 | Ganser et al. |
| 5,564,246 A | 10/1996 | Champagne |
| 5,565,056 A | 10/1996 | Lause et al. |
| 5,575,127 A | 11/1996 | O'Neal |
| 5,581,970 A | 12/1996 | O'Shea |
| 5,586,415 A | 12/1996 | Fisher et al. |
| 5,598,677 A | 2/1997 | Rehm, III |
| 5,613,337 A | 3/1997 | Plath et al. |
| 5,622,020 A | 4/1997 | Wood |
| 5,634,314 A | 6/1997 | Champagne |
| 5,651,227 A | 7/1997 | Anderson |
| 5,661,939 A | 9/1997 | Coulis et al. |
| 5,662,977 A | 9/1997 | Spain et al. |
| 5,664,376 A | 9/1997 | Wilson et al. |
| 5,675,955 A | 10/1997 | Champagne |
| 5,678,367 A | 10/1997 | Kline |
| 5,694,728 A | 12/1997 | Heath, Jr. et al. |
| 5,720,114 A | 2/1998 | Guerin |
| 5,729,946 A | 3/1998 | Beck |
| 5,737,881 A | 4/1998 | Stocksieker |
| 5,765,333 A | 6/1998 | Cunningham |
| 5,768,844 A | 6/1998 | Grace, Sr. et al. |
| 5,791,093 A | 8/1998 | Diamond |
| 5,806,185 A | 9/1998 | King |
| 5,809,731 A | 9/1998 | Reiss |
| 5,829,206 A | 11/1998 | Bachman |
| 5,836,113 A | 11/1998 | Bachman |
| D402,770 S | 12/1998 | Hendrickson et al. |
| 5,857,303 A | 1/1999 | Beck et al. |
| 5,858,522 A | 1/1999 | Turk et al. |
| 5,866,054 A | 2/1999 | Dorchester et al. |
| 5,866,639 A | 2/1999 | Dorchester et al. |
| 5,869,176 A | 2/1999 | Dorchester et al. |
| 5,878,543 A | 3/1999 | Mowery |
| 5,946,876 A | 9/1999 | Grace, Sr. et al. |
| 5,956,914 A | 9/1999 | Williamson |
| 5,974,756 A | 11/1999 | Alvarez et al. |
| 6,029,415 A | 2/2000 | Culpepper et al. |
| 6,035,587 A | 3/2000 | Dressler |
| 6,047,507 A | 4/2000 | Lappin et al. |
| 6,050,041 A | 4/2000 | Mowery et al. |
| 6,086,997 A | 7/2000 | Patel et al. |
| D429,009 S | 8/2000 | Ginzel |
| 6,122,877 A | 9/2000 | Hendrickson et al. |
| 6,161,354 A | 12/2000 | Gilbert et al. |
| 6,187,424 B1 | 2/2001 | Kjellqvist et al. |
| 6,195,952 B1 | 3/2001 | Culpepper et al. |
| 6,223,488 B1 | 5/2001 | Pelfrey et al. |
| 6,233,890 B1 | 5/2001 | Tonyan |
| 6,263,574 B1 | 7/2001 | Lubker, II et al. |
| 6,272,797 B1 | 8/2001 | Finger |
| D447,820 S | 9/2001 | Grace |
| 6,282,858 B1 | 9/2001 | Swick |
| D448,865 S | 10/2001 | Manning |

| | | |
|---|---|---|
| 6,295,777 B1 | 10/2001 | Hunter et al. |
| D450,138 S | 11/2001 | Barber |
| 6,321,500 B1 | 11/2001 | Manning et al. |
| 6,336,988 B1 | 1/2002 | Enlow et al. |
| 6,348,512 B1 | 2/2002 | Adriani |
| D454,962 S | 3/2002 | Grace |
| 6,358,585 B1 | 3/2002 | Wolff |
| 6,360,508 B1 | 3/2002 | Pelfrey et al. |
| 6,363,676 B1 | 4/2002 | Martion, III |
| 6,367,220 B1 | 4/2002 | Krause et al. |
| 6,393,792 B1 | 5/2002 | Mowery et al. |
| 6,442,912 B1 | 9/2002 | Phillips et al. |
| 6,516,577 B2 | 2/2003 | Pelfrey et al. |
| 6,526,718 B2 | 3/2003 | Manning et al. |
| 6,539,675 B1 | 4/2003 | Gile |
| 6,625,939 B1 | 9/2003 | Beck et al. |
| 6,673,868 B2 | 1/2004 | Choulet |
| 6,716,522 B2 | 4/2004 | Matsumoto et al. |
| 6,752,941 B2 | 6/2004 | Hills |
| 6,784,230 B1 | 8/2004 | Patterson et al. |
| 7,204,062 B2 | 4/2007 | Fairbanks et al. |
| 2002/0018907 A1 | 2/2002 | Zehner |
| 2002/0020125 A1 | 2/2002 | Pelfrey et al. |
| 2002/0025420 A1 | 2/2002 | Wanat et al. |
| 2002/0029537 A1 | 3/2002 | Manning et al. |
| 2002/0054996 A1 | 5/2002 | Rheenen |
| 2002/0056244 A1 | 5/2002 | Hertweck |
| 2002/0076544 A1 | 6/2002 | DeWorth et al. |
| 2002/0078650 A1 | 6/2002 | Bullinger et al. |
| 2002/0177658 A1 | 11/2002 | Tajima et al. |
| 2003/0131551 A1 | 7/2003 | Mollinger et al. |
| 2003/0154664 A1 | 8/2003 | Beck et al. |
| 2004/0142157 A1 | 7/2004 | Melkonian |
| 2005/0081468 A1 | 4/2005 | Wilson et al. |
| 2006/0053740 A1 | 3/2006 | Wilson et al. |

FOREIGN PATENT DOCUMENTS

| | | |
|---|---|---|
| CA | 2267000 | 4/2003 |
| CL | 3.856 | 5/2001 |
| DE | 40104760.1 | 5/2001 |
| EP | 1086988 A1 | 3/2001 |
| GB | 1068202 | 5/1967 |
| GB | 2101944 | 8/2001 |
| JP | 364001539 A | 1/1989 |
| JP | 409141752 A | 6/1997 |
| JP | 410018555 A | 1/1998 |
| JP | 02001079951 A | 3/2001 |
| KR | 321694 | 3/2003 |
| PL | 4115 | 7/2004 |
| WO | 00/55446 A1 | 9/2000 |

OTHER PUBLICATIONS

Dupont Dow, web site print outs from www.dupontdow.com, "Adhesives," Aug. 12, 2000, 3 pages.

Dupont Dow, web site print outs from www.dupontdow.com, "Neoprene—Grades of Neoprene—AquaStik™ Water Based Polychloroprene." Aug. 12, 2000, 2 pages.

Dupont Dow, web site print outs from www.dupontdow.com, "Neoprene—Grades of Neoprene—Neoprene Solid Grades for Solvent-Based Adhesives." Aug. 12, 2000, 2 pages.

Crane Performance Siding, "New Craneboard solid core siding redefines home exterior siding," news release online, Mar. 20, 2001, 3 pages.

Weiker, Jim, "Crane puts new face on siding," The Columbus Dispatch, May 9, 2002, 3 pages.

Feirer, Mark, "Vinyl Siding, Love it or hate it, plastic is here to stay," This Old House Online, no date, 8 pages.

Engineering drawing dated Feb. 28, 2002 of a portion of the sample of the known siding panel.

Three photographs of a portion of an actual sample of the known siding-panel.

STRAIGHT FACE SIDING

This application is a continuation of U.S. application Ser. No. 09/751,185, filed Dec. 29, 2000 now U.S. Pat. No. 7,204,062, which is a continuation of U.S. Design Application No. 29/133,077, filed Nov. 20, 2000 now U.S. Pat. No. D,450,138, each of which is incorporated by reference in its entirety.

BACKGROUND AND SUMMARY OF THE INVENTION

The present invention relates generally to vinyl siding and, more particularly, to vinyl siding having at least one relatively straight, planar portion.

Vinyl siding may be produced by extruding at least one vinyl composition. For example, vinyl siding can be made by co-extruding a vinyl substrate and a vinyl capstock. The extruded vinyl is passed through a calibrator, e.g., a die, to obtain a final net shape. However, as the vinyl cools after passing through the calibrator, it has an inherent tendency to oil can. As is well known in the art, oil canning refers to the inherent tendency of a sheet of vinyl to curve in either a concave or convex direction as it cools.

As a result of the oil canning effect, it has been believed by those skilled in the art that it is not possible to produce vinyl siding having at least one relatively straight, planar portion. Thus, the designs of vinyl siding have been limited. Vinyl siding commonly has at least one horizontal row. Each row of the siding is subject to the oil canning effect. Consequently, in order to limit the oil canning effect, it has been tried to limit the width of each row and the height of each seam connecting adjacent rows. Moreover, it is common to produce the vinyl siding such that each row already has a significant amount of curvature as it exits the calibrator so as to minimize the oil canning effect. These design considerations have limited and/or diminished the appearance of the vinyl siding. Therefore, a need exists for a vinyl siding panel that has at least one relatively straight, planar portion despite the inherent tendency of vinyl siding to oil can.

One embodiment of the present invention is a vinyl siding panel comprising a planar portion extending the longitudinal length of the vinyl siding panel. The planar portion comprises a first edge and a second edge. The width from the first edge to the second edge is at least about 4.0 inches. In addition, the planar portion has a surface variance of less than about 0.05 inches relative to an imaginary straight line connecting the first edge and the second edge.

A second embodiment of the present invention is a vinyl siding panel comprising a planar portion extending the longitudinal length of the vinyl siding panel. The planar portion comprises a first edge and a second edge, wherein the width from the first edge to the second edge is at least about 4.0 inches. In addition, the radius curvature between the first edge and the second edge is at least about 85 inches.

A third embodiment of the present invention is a method of producing a vinyl siding panel having a substantially straight, planar portion. The method comprises extruding at least one vinyl composition and passing the vinyl composition(s) through a calibrator defining a passageway corresponding to the substantially straight, planar portion. The passageway has a first edge and a second edge. The width from the first edge to the second edge is at least about 4.0 inches, and the surface variance is less than about 0.05 inches relative to an imaginary straight line connecting the first edge and the second edge.

A fourth embodiment of the present invention is also a method of producing a vinyl siding panel having a substantially straight, planar portion. In this embodiment, the method comprises extruding at least one vinyl composition. The vinyl is then passed through a calibrator defining a passageway corresponding to the substantially straight, planar portion. The passageway has a first edge and a second edge. The width is at least about 4.0 inches from the first edge to the second edge, and the radius curvature between the first edge and the second edge is at least about 85 inches.

In addition to the novel features and advantages mentioned above, other objects and advantages of the present invention will be readily apparent from the following descriptions of the drawings and exemplary embodiments.

DETAILED DESCRIPTION OF EXEMPLARY EMBODIMENT(S)

The present invention is directed to vinyl siding having at least one relatively straight, planar portion. In addition, the present invention includes a method of making vinyl siding having at least one relatively straight, planar portion.

Figure 1:
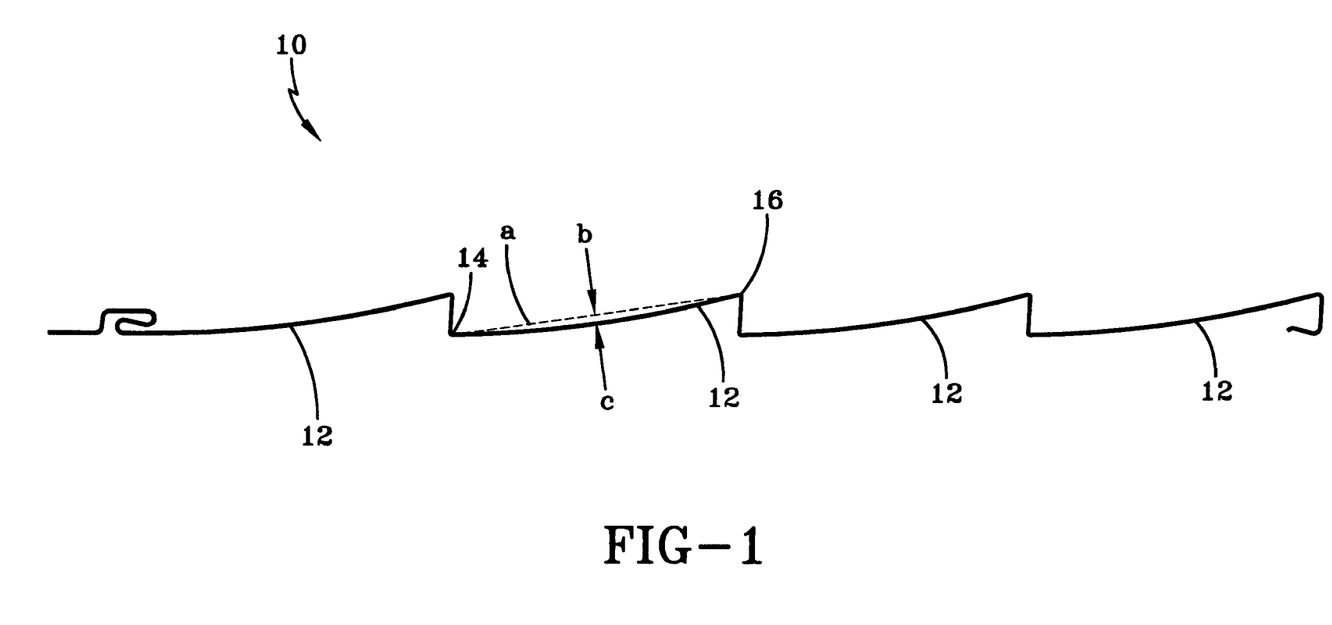
FIG. 1 is a side elevation view of a vinyl siding panel having significantly curved rows.

FIG. 1 shows an example of a vinyl siding panel 10 having a plurality of curved rows 12. Each of the rows 12 has an edge 14 and an edge 16. The degree of curvature between edge 14 and edge 16 can be measured in at least a couple different ways. In the first method, an imaginary straight line a is made between edge 14 and edge 16. The surface variance is then measured between the outer surface of the vinyl siding panel 10 and the line a as indicated by arrow b and arrow c. Alternatively, the radius curvature can be measured between edge 14 and edge 16.

Figure 2:
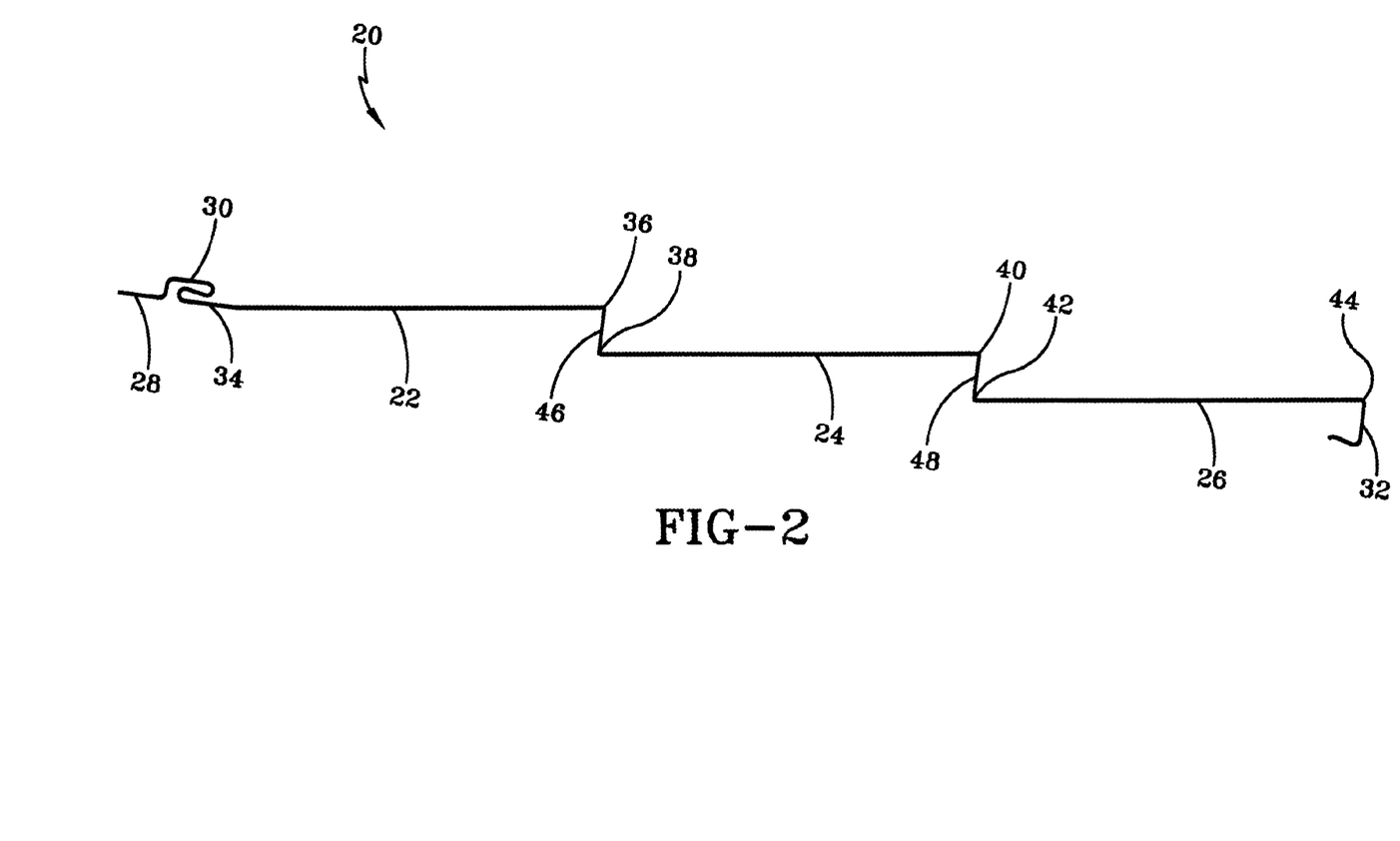
FIG. 2 is a side elevation view of one embodiment of a vinyl siding panel of the present invention.

FIG. 2 illustrates one example of a vinyl siding panel 20 of the present invention. In this example, the vinyl siding panel 20 is comprised of a row 22, a row 24, and a row 26. In addition, the vinyl siding panel 20 may include a nailing strip 28, a tongue 30, and a groove 32. Nails or any other suitable mechanical fastening means may be extended through apertures in the nailing strip 28 in order to secure the vinyl siding panel 20 to a building structure. The tongue 30 is adapted to fit in the groove of another siding panel when installed on a building structure. Likewise, the groove 32 is adapted to receive the tongue of another siding panel when installed on a building structure.

Each of the rows 22, 24, 26 is a planar portion. Row 22 has an edge 34 and edge 36. Row 24 has an edge 38 and an edge 40, and row 26 has an edge 42 and an edge 44. The nailing strip 28 and the tongue 30 are connected to the edge 34 of row 22. Edge 36 of row 22 is connected to edge 38 of row 24 by seam 46. Similarly, edge 40 of row 24 is connected to edge 42 of row 26 by seam 48. As a result, this example of the vinyl siding panel 20 has a stepped contour.

As in this example, it is preferred that each of the rows 22, 24, 26 are substantially similar. However, it should be recognized that a vinyl siding panel of the present invention may have only one relatively straight, planar portion. It should also be recognized that a vinyl siding panel of the present invention may have any plural number of relatively straight, planar portions.

For ease of description, the dimensions of a planar portion of the present invention will be described with regard to row 24 of vinyl siding panel 20. The width of row 24 from edge 38 to edge 40 is at least about 4.0 inches, more preferably at least about 5.0 inches, and still more preferably at least about 6.0 inches. The surface variance, as defined with regard to FIG. 1, from edge 38 to edge 40 is less than about 0.05 inches, more preferably less than about 0.04 inches, and still more preferably less than about 0.03125 inches. In addition, the radius curvature from edge 38 to edge 40 is at least about 85 inches, more preferably at least about 117 inches, and even more preferably at least about 148 inches.

The row 24 may have any desired thickness from its outer surface to its inner surface. However, it is preferred that the row 24 has an average thickness in the range from about 0.040 inches to about 0.050 inches. More preferably, the average thickness of the row 24 is in the range from about 0.041 inches and 0.046 inches.

The inventors have discovered that the height of the seams 46, 48 may be greater than in conventional vinyl siding. In fact, it is believed that the increased height of the seams 46, 48 may facilitate the production of the vinyl siding of the present invention. In particular, the height of each of the seams 38, 40 may be at least about 0.5 inches. More preferably, the height of each of the seams 38, 40 may be at least about 0.6 inches.

Figure 4:
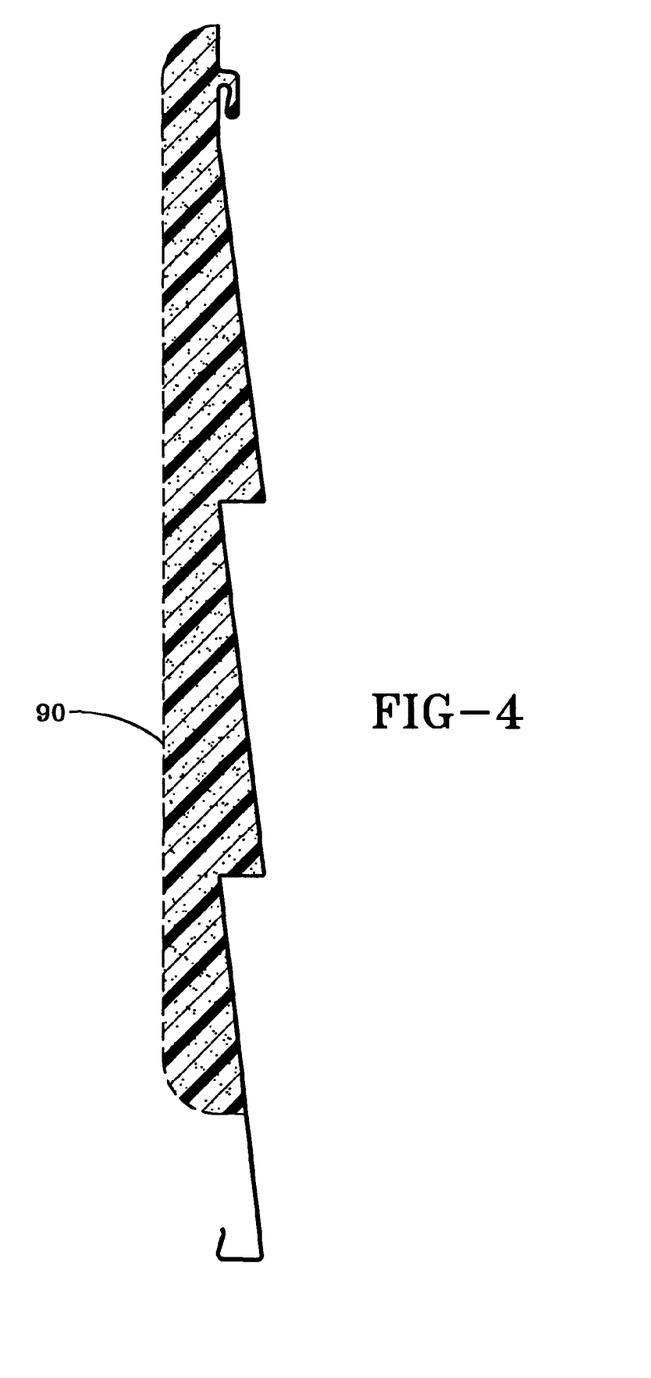
FIG. 4 is a side elevation view of one embodiment of a vinyl siding panel of the present invention that includes a reinforcement panel.

If desired, a reinforcement panel may be secured to, or positioned behind, the inner surface of the vinyl siding panel 20. For example, a foam reinforcement panel may be secured to the inner surface of the vinyl siding panel 20 by an adhesive. The reinforcement panel may tend to further straighten out rows 22, 24, 26 of the vinyl siding panel 20. Nevertheless, it should be recognized that the dimensions of the planar portion(s) discussed above are taken prior to the application of a reinforcement panel or any other straightening means. FIG. 4 shows an exemplary embodiment in which a reinforcement panel 90 is secured to the vinyl siding.

It is preferred that the vinyl siding meets or exceeds the ASTM D3679 standard. The vinyl siding of the present invention may be made from any known, suitable, or conventional vinyl composition(s). For example, the vinyl siding may be comprised of a vinyl substrate layer and an optional vinyl capstock layer. The vinyl composition(s) may include one or more additives. For instance, the vinyl composition(s) may include one or more additives to improve processing, durability, weatherability, resistance to ultraviolet (UV) degradation, impact resistance, and other qualities of vinyl siding. An example of a weathering agent is titanium dioxide, and examples of a vinyl substrate composition and a vinyl capstock composition are polyvinyl chloride (PVC) compositions. For instance, these compositions may include the following ingredients in about the following amounts:

| VINYL SUBSTRATE COMPOSITION | |
|---|---|
| PVC resin | 100 |
| Tin Stabilizer(s) | 0.5-2.0 |
| Processing Aid(s) | 0-2.0 |
| Lubricant(s) | 1.5-3.5 |
| Impact Modifier(s) | 2.0-6.0 |
| Mineral Filler(s) | 0-12 |
| Weathering Agent(s) | 0.5-12 |
| Colorant(s) | As Desired |

| VINYL CAPSTOCK COMPOSITION | |
|---|---|
| PVC resin | 100 |
| Tin Stabilizer(s) | 0.5-2.0 |
| Processing Aid(s) | 0-2.0 |
| Lubricant(s) | 1.5-3.5 |
| Impact Modifier(s) | 2.0-6.0 |
| Weathering Agent(s) | 9-11 |
| Colorant(s) | As Desired |

Although the present invention has been described primarily with regard to vinyl siding, alternative embodiments of the present invention include panels made from other extrudable, plastic materials. For example, panels of the present invention may also be made from polystyrene, acrylonitrile-butadiene-styrene (ABS), nylon, ethylene-vinyl acetate (EVA), polycarbonate, polyethylene (PE), polypropylene (PP), polyethylene terephthalate (PET), thermoplastic olefins, acrylonitrile-styrene-acrylic (ASA), other similar or conventional plastics, and alloys, blends, and coextrusions of these resins.

Figure 3:
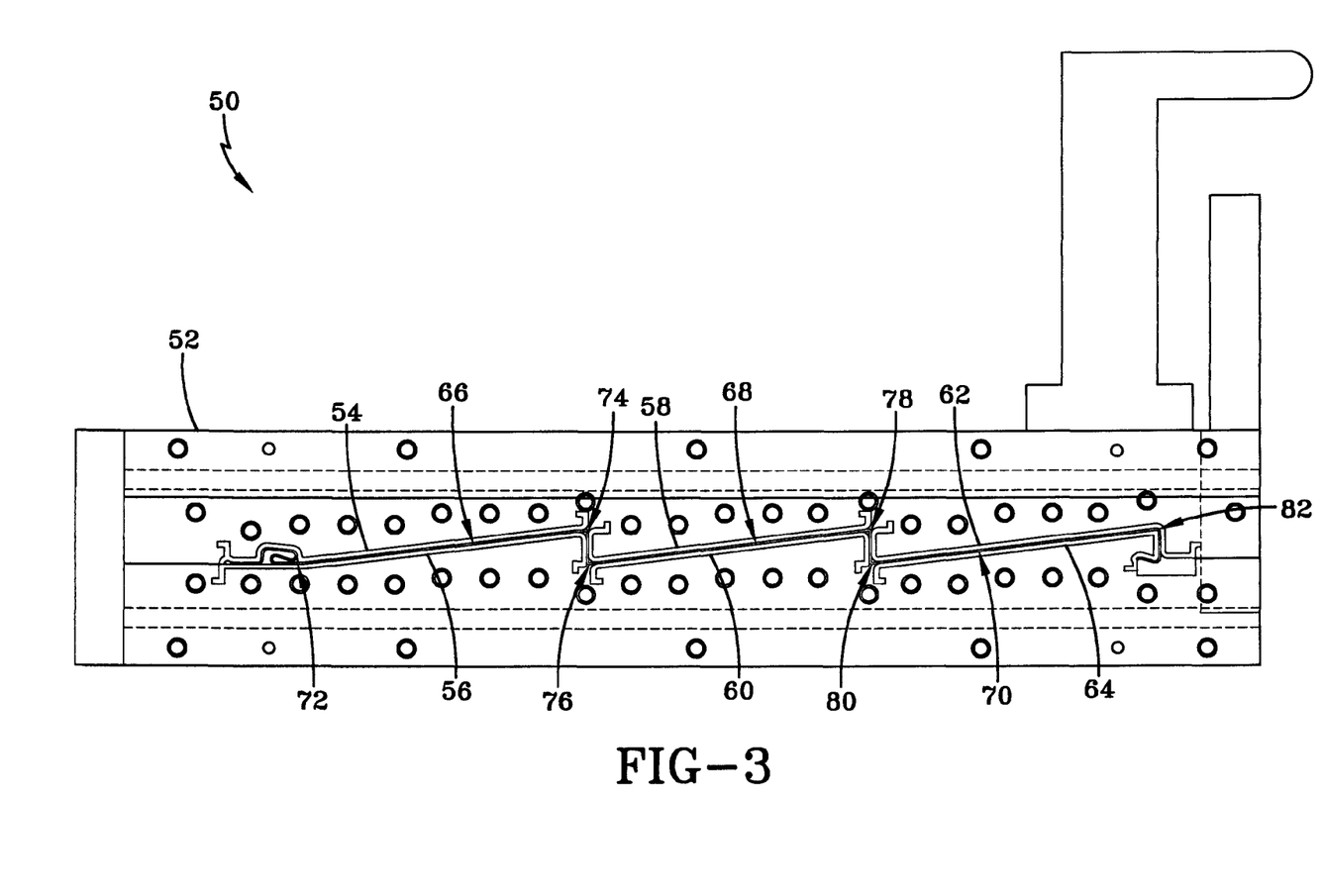
FIG. 3 is a side elevation view of one embodiment of a calibrator of the present invention.

The vinyl siding of the present invention may be manufactured by extruding at least one vinyl composition. The vinyl is then passed through a calibrator. FIG. 3 shows an example of a calibrator 50. Optionally, a preforming guide, another calibrator, and/or any other desired manufacturing components may be interposed between the extruder and the calibrator 50. The preforming guide and the other calibrator may be used to form the vinyl into the general shape of the vinyl siding, and the calibrator 50 is used to obtain the final net shape of the vinyl siding. However, it should be recognized that the vinyl siding may relax slightly after it exits the calibrator 50 and cools down. Optionally, the vinyl siding may be passed under at least one embossing roller and at least one cooling roller and then into a water bath after exiting the calibrator 50. The embossing roller(s) may be used to give the vinyl siding a wood-grain appearance, and the cooling roller(s) and the water bath may be used to further cool down the vinyl siding to limit the effect of oil canning and distortion.

In the example of FIG. 3, the calibrator 50 is comprised of a housing 52 and optional inserts 54, 56, 58, 60, 62, 64. In addition, the calibrator may include at least one internal conduit to conduct at least one flow of water to help cool the calibrator 50. The flow of water may be any desired temperature, but it is preferably between about 48 and about 52 degrees Fahrenheit. The housing 52 may be comprised of any suitable material such as aluminum, and the inserts 54, 56, 58, 60, 62, 64 may be comprised of any suitable material such as titanium or ferro-TIC. The inserts 54, 56, 58, 60, 62, 64 are mounted in the housing 52 and define passageways 66, 68, 70 corresponding to the planar portions of the vinyl siding. Alternatively, the housing itself may define the passageways. In addition, it should be recognized that the calibrator may have only one or any plural number of passageways as needed.

Passageway 66 has an edge 72 and edge 74. Passageway 68 has an edge 76 and an edge 78, and passageway 70 has an edge 80 and an edge 82. For ease of description, the dimensions of a passageway of a calibrator of the present invention will be described with regard to passageway 68 of calibrator 50. The width of passageway 68 from edge 76 to edge 78 is at least about 4.0 inches, more preferably at least about 5.0 inches, and still more preferably at least about 6.0 inches. The surface variance from edge 76 to edge 78 is less than about 0.05 inches, more preferably less than about 0.04 inches, and still more preferably less than about 0.03125 inches. In addition, the radius curvature from edge 76 to edge 78 is at least about 85 inches, more preferably at least about 117 inches, and even more preferably at least about 148 inches.

EXAMPLE

A vinyl siding panel as shown in FIG. 2 was manufactured by extruding a PVC substrate composition and a PVC capstock composition. The extrusion temperature varied between about 340 and about 360 degrees Fahrenheit. After the extruder, the vinyl was passed through a preforming guide and a first calibrator to obtain the general shape of the vinyl siding. The vinyl was then passed through a second calibrator like the one shown in FIG. 3 at a rate of about 48 to about 50 feet per minute to obtain the final net shape of the vinyl siding. Each passageway of the second calibrator had a width of about 6.0 inches, a surface variance of about 0.03125 inches, and a radius curvature of about 148.5 inches. The vinyl siding was then passed under embossing rollers to impart a woodgrain pattern. Thereafter, the vinyl siding was passed under cooling rollers and through a water bath to further cool it down. Each planar portion of the resulting vinyl siding had a thickness of about 0.045 inches, a width of about 6.0 inches, a surface variance of about or less than 0.03125 inches, and a radius curvature of about or more than 148.5 inches. Furthermore, the height of each of the seams connecting the planar portions was about 0.6875 inches.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A siding panel unit comprising:
    a siding panel comprising a first portion extending the longitudinal length of the siding panel, said first portion comprising:
        a first edge and a second edge;
        a width of at least about 4.0 inches from said first edge to said second edge; and
        a slight curvature between said first edge and said second edge such that said slight curvature has a surface variance of less than about 0.05 inches relative to an imaginary straight line connecting said first edge and said second edge; and
    a reinforcement panel adjacent to said first portion;
    wherein said surface variance is determined prior to said first portion being positioned adjacent to said reinforcement panel; and
    wherein said siding panel unit simulates the appearance of straight face siding.

2. The siding panel unit of claim 1 wherein said siding panel is comprised of vinyl.

3. The siding panel unit of claim 1 wherein said siding panel is comprised of polypropylene (PP).

4. The siding panel unit of claim 1 wherein said siding panel is comprised of acrylonitrile-butadiene-styrene (ABS).

5. The siding panel unit of claim 1 wherein said siding panel is comprised of acrylonitrile-styrene-acrylic (ASA).

6. The siding panel unit of claim 1 wherein said siding panel is comprised of plastic resin selected from the group consisting of polystyrene, nylon, ethylene-vinyl acetate (EVA), polycarbonate, polyethylene (PE), polyethylene terephthalate (PET), thermoplastic olefins, other similar or conventional plastic resins, and alloys, blends, and coextrusions of these resins.

7. The siding panel unit of claim 1 wherein said reinforcement panel is comprised of foam.

8. The siding panel unit of claim 1 wherein said first portion has an average thickness in the range from about 0.040 inches to about 0.050 inches.

9. The siding panel unit of claim 1 wherein said first portion has said width of at least about 6.0 inches from said first edge to said second edge.

10. The siding panel unit of claim 1 wherein said surface variance is less than about 0.04 inches.

11. The siding panel unit of claim 1 wherein said surface variance is less than about 0.03125 inches.

12. The siding panel unit of claim 1 wherein:
    said first portion has said width of at least about 6.0 inches from said first edge to said second edge; and
    said surface variance is less than about 0.04 inches.

13. The siding panel unit of claim 1 further comprising a second portion extending the longitudinal length of the siding panel, said second portion comprising:
    a first edge and a second edge;
    a width of at least about 4.0 inches from said first edge to said second edge of said second portion; and
    a slight curvature between said first edge and said second edge such that said slight curvature has a surface variance of less than about 0.05 inches relative to an imaginary straight line connecting said first edge and said second edge of said second portion;
    wherein said second portion is connected to said first portion by a first seam to define a stepped contour; and
    wherein said reinforcement panel is adjacent to said second portion.

14. The siding panel unit of claim 13 wherein a height of said first seam is at least about 0.5 inches.

15. The siding panel unit of claim 13 further comprising a third portion extending the longitudinal length of the siding panel, said third portion comprising:
    a first edge and a second edge;
    a width of at least about 4.0 inches from said first edge to said second edge of said third portion; and
    a slight curvature between said first edge and said second edge such that said slight curvature has a surface variance of less than about 0.05 inches relative to an imaginary straight line connecting said first edge and said second edge of said third portion;
    wherein said third portion is connected to said first portion by a second seam to define a stepped contour; and
    wherein said reinforcement panel is adjacent to said third portion.

16. The siding panel unit of claim 15 wherein a height of said second seam is at least about 0.5 inches.

17. A siding panel unit comprising:
    a siding panel comprising a first portion extending the longitudinal length of the siding panel, said first portion comprising:
        a first edge and a second edge;
        a width of at least about 4.0 inches from said first edge to said second edge; and
        a radius curvature between said first edge and said second edge of at least about 85 inches; and
    a reinforcement panel adjacent to said first portion;

wherein said radius curvature is determined prior to said first portion being positioned adjacent to said reinforcement panel; and wherein said siding panel unit simulates the appearance of straight face siding.

18. The siding panel unit of claim 17 wherein said siding panel is comprised of vinyl.

19. The siding panel unit of claim 17 wherein said siding panel is comprised of polypropylene (PP).

20. The siding panel unit of claim 17 wherein said siding panel is comprised of acrylonitrile-butadiene-styrene (ABS).

21. The siding panel unit of claim 17 wherein said siding panel is comprised of acrylonitrile-styrene-acrylic (ASA).

22. The siding panel unit of claim 17 wherein said siding panel is comprised of plastic resin selected from the group consisting of polystyrene, nylon, ethylene-vinyl acetate (EVA), polycarbonate, polyethylene (PE), polyethylene terephthalate (PET), thermoplastic olefins, other similar or conventional plastic resins, and alloys, blends, and coextrusions of these resins.

23. The siding panel of claim 17 wherein said reinforcement panel is comprised of foam.

24. The siding panel unit of claim 17 wherein said first portion has an average thickness in the range from about 0.040 inches to about 0.050 inches.

25. The siding panel unit of claim 17 wherein said first portion has said width of at least about 6.0 inches from said first edge to said second edge.

26. The siding panel unit of claim 17 wherein said radius curvature is at least about 117 inches.

27. The siding panel unit of claim 17 wherein said radius curvature is at least about 148 inches.

28. The siding panel unit of claim 17 wherein:
said first portion has said width of at least about 6.0 inches from said first edge to said second edge; and
said radius curvature is at least about 117 inches.

29. The siding panel unit of claim 17 further comprising a second portion extending the longitudinal length of the siding panel, said second portion comprising:
a first edge and a second edge;
a width of at least about 4.0 inches from said first edge to said second edge of said second portion; and
a radius curvature between said first edge and said second edge of said second portion of at least about 85 inches;
wherein said second portion is connected to said first portion by a first seam to define a stepped contour; and
wherein said reinforcement panel is adjacent to said second portion.

30. The siding panel unit of claim 29 wherein a height of said first seam is at least about 0.5 inches.

31. The siding panel unit of claim 29 further comprising a third portion extending the longitudinal length of the siding panel, said third portion comprising:
a first edge and a second edge;
a width of at least about 4.0 inches from said first edge to said second edge of said third portion; and
a radius curvature between said first edge and said second edge of said third portion of at least about 85 inches;
wherein said third portion is connected to said first portion by a second seam to define a stepped contour; and
wherein said reinforcement panel is adjacent to said third portion.

32. The siding panel unit of claim 31 wherein a height of said second seam is at least about 0.5 inches.

* * * * *